(12) United States Patent
Aström et al.

(10) Patent No.: US 8,489,743 B2
(45) Date of Patent: Jul. 16, 2013

(54) METHOD AND APPARATUS FOR PROVIDING ADMINISTRATIVE REGISTRATION

(75) Inventors: Bo Aström, Stockholm (SE); Stephen Terrill, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 436 days.

(21) Appl. No.: 12/027,006

(22) Filed: Feb. 6, 2008

(65) Prior Publication Data

US 2008/0189414 A1 Aug. 7, 2008

Related U.S. Application Data

(60) Provisional application No. 60/888,411, filed on Feb. 6, 2007.

(51) Int. Cl.
*G06F 15/16* (2006.01)
*G06F 15/173* (2006.01)

(52) U.S. Cl.
USPC ........... 709/226; 709/203; 709/204; 709/227; 709/228; 709/229

(58) Field of Classification Search
USPC ............... 709/226–229, 203, 204; 455/432.1, 455/433, 435.1
See application file for complete search history.

(56) References Cited

U.S. PATENT DOCUMENTS

| | | | |
|---|---|---|---|
| 2003/0092425 A1* | 5/2003 | Okazaki et al. | 455/411 |
| 2004/0068574 A1* | 4/2004 | Costa Requena et al. | 709/230 |
| 2004/0184435 A1* | 9/2004 | Westman | 370/349 |
| 2004/0230697 A1* | 11/2004 | Kiss et al. | 709/245 |
| 2005/0083909 A1* | 4/2005 | Kuusinen et al. | 370/352 |
| 2005/0136926 A1* | 6/2005 | Tammi et al. | 455/435.1 |
| 2006/0270404 A1* | 11/2006 | Tuohino et al. | 455/432.3 |
| 2007/0038723 A1* | 2/2007 | Gourraud | 709/218 |
| 2007/0133782 A1* | 6/2007 | Zhu | 379/265.09 |
| 2008/0144637 A1* | 6/2008 | Sylvain et al. | 370/401 |
| 2010/0008352 A1* | 1/2010 | Przybysz et al. | 370/352 |

OTHER PUBLICATIONS

3GPP TS 24.229 V7.2.0; 3rd Generation Partnership Project; Published Dec. 2005; Retrieved from http://www.3gpp.org/ftp/specs/archive/24_series/24.229/24229-720.zip.*

3GPP. $3^{rd}$ Generation Partnership Project; Technical Specification Group Services and System Aspects; IP Multimedia Subsystem (IMS); Stage 2 (Release 7). TS 23.228 V7.5.0 (Sep. 2006).

3GPP. $3^{rd}$ Generation Partnership Project; Technical Specification Group Core Network and Terminals; IP Multimedia (IM) Subsystem Cx and Dx Interfaces; Signalling Flows and Message Contents (Release 7). TS 29.228 V7.3.0 (Sep. 2006).

(Continued)

*Primary Examiner* — Chau Le

(57) ABSTRACT

There is a need in the art for application servers to be able to exhibit the same behavior irrespective of the used access technology. In order to address this need the present invention provides methods and apparatuses for allowing one or more subscribers to be administratively registered.

28 Claims, 9 Drawing Sheets

OTHER PUBLICATIONS

3GPP. 3rd Generation Partnership Project; Technical Specification Group Core Network and Terminals; IP Multimedia Call Control Protocol Based on Session Initiation Protocol (SIP) and Session Description Protocol (SDP); Stage 3 (Release 7). TS 24.229 V7.6.0 (Dec. 2006).

3GPP. 3rd Generation Partnership Project; Technical Specification Group Core Network and Terminals; IP Multimedia (IM) Subsystem Sh Interface; Signalling Flows and Message Contents (Release 7). TS 29.328 V7.4.0 (Dec. 2006).

Altman, et al. Telenet Kermit Option. RFC 2840. May 2000.

Rosenberg, et al. Caller Preferences for the Session Initiation Protocol (SIP). RFC 3841. Aug. 2004.

3rd Generation Partnership Project; Technical Specification Group Services and System Aspects; Voice Call Continuity (VCC) between Circuit Switched (CS) and IP Multimedia Subsystems (IMS); Stage 2 (Release 7). 3GPP TS 23.206 v7.1.0 (Dec. 2006).

* cited by examiner

METHOD AND APPARATUS FOR PROVIDING ADMINISTRATIVE REGISTRATION

CROSS REFERENCE TO RELATED APPLICATIONS

This application claims the benefit of U.S. Provisional Application No. 60/888,411, filed Feb. 6, 2007, the disclosure of which is incorporated herein by reference.

FIELD

The present invention relates to Internet Protocol Multimedia Subsystem networks. More particularly, the present invention relates to administrative registration of one or more users using IMS networks.

BACKGROUND

In Internet Protocol Multimedia Subsystem (IMS) networks, a terminal is required to register IMS public user identifiers to the IMS network in order to receive terminating calls for the IMS public user identifiers. The IMS also uses application servers (AS) to assist in providing services to IMS users. As such, the registration status of an IMS public user identifier is an indication of whether the network views that the user is reachable or not. As such, the Registration status impacts the application logic of application servers, and also which application servers can be invoked.

In addition to performing the initial Registration to the IMS network, a termination is required to periodically refresh the registration state in the network via performing the registration again. The terminal may also cancel the registration (e.g. before powering down). It is possible to administratively de-register a user from the network.

As such, a home subscriber server (HSS) recognizes that a user may be:
Registered: A Public User Identity is Registered at the request of the user and has an S-CSCF assigned.
Un-Registered: A public User Identity is not registered but has a S-CSCF assigned to execute Unregistered state services as a consequence of a terminating call or there is a S-CSCF keep the profile stored
Not-Registered: Public Identity is not Registered and has no S-CSCF assigned.

System and service aspects of IMS (among other registration and de-registration procedures) are described in Third Generation Partnership Project (3GPP) Technical Specification (TS) 23.228 V7.5.0 (September 2006). A more detailed description of the service logic for some of these service aspects and procedures is given in 3GPP TS 29.228 V7.3.0 (September 2006).

Whether the Public user identity is Registered or Un-Registered/Not Registered may impact which application servers are invoked as different Filter Criteria is applied, and/or the behavior of the application logic within the application servers. This can imply that the expected behavior of an application server is different when the call originates from the circuit switch (CS) domain or the IMS domain, in that when originating/terminating a call to/from a packet switch (PS) access over IMS (normal access to IMS), the application servers will see that the user is Registered and apply registered services, however when originating/terminating a call via a CS access, the user may be unregistered.

One example is in the case of a terminating call for a voice call continuity (VCC) user. If the user is registered, the application logic is likely to try to deliver the call to the user, however if the user is not registered, the application logic is likely to forward the call to, e.g., a mail box. However, applications are appearing where a call may be made to or from a user, where the terminal for the user has not performed a registration. One example of this is VCC which is being progressed within 3GPP. TS 23.206 describes a VCC user entity (UE) that can originate and terminate a call without being registered to the IMS.

BRIEF DESCRIPTION OF THE DRAWINGS

In the following section, the invention will be described with reference to exemplary embodiments illustrated in the figures, in which.

SUMMARY

Figure 1:
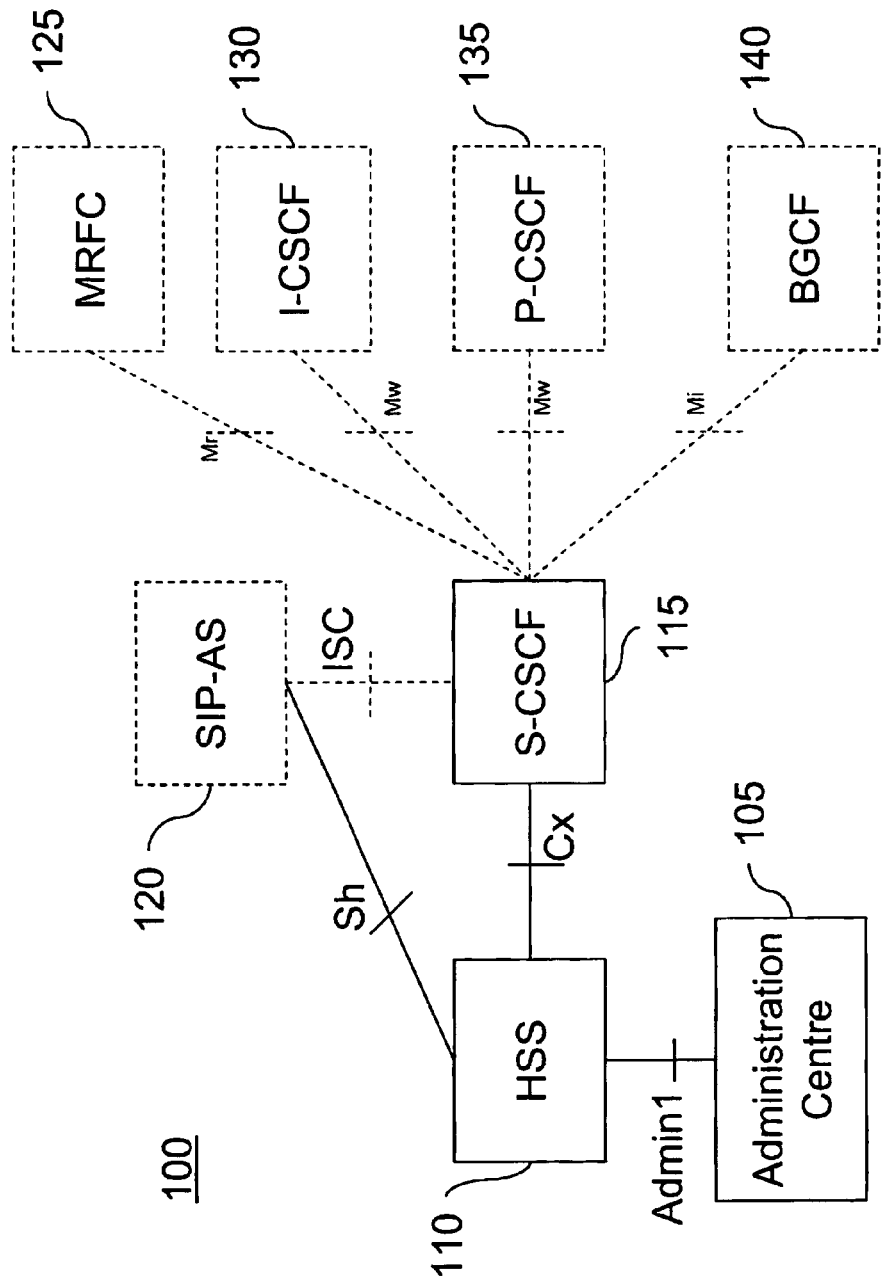
FIG. 1 illustrates a system for administrative registration according to one embodiment of the present invention.

There is a need in the art for application servers to be able to exhibit the same behavior irrespective of the used access technology. The present invention provides methods and apparatuses for providing administrative registration in IMS to address this need.

A method and apparatus for providing administrative registration in an internet protocol multimedia subsystem using an administration centre is provided. In one embodiment, user data of a user to be registered is obtained. A home subscriber server for the user is determined. An administrative request is sent to the home subscriber server.

A method and apparatus for providing administrative registration in an internet protocol multimedia subsystem using a home subscriber server is provided. In one embodiment, an administrative request is received. A determination is made as to whether a serving call session control function has been assigned for a user. The user is registered with the serving call session control function. The serving call session control function is provided with information from the administrative request.

A method and apparatus for providing administrative registration in an internet protocol multimedia subsystem using a serving call session control function is provided. In one embodiment, information associated with an administrative request is received. The received information is stored. Depending on the settings for the subscriber a third party registration may be performed when the information comprises initial filter information.

A method and apparatus for providing administrative registration in an internet protocol multimedia subsystem using an administration centre is provided. In one embodiment, user data of a user to be registered is obtained. A determination is made as to whether a serving call session control function has been allocated for the user. An administrative request is sent to the serving call session control function.

A method and apparatus for providing administrative registration in an internet protocol multimedia subsystem using a serving call session control function is provided. In one embodiment, an administrative request is received. Information associated with the administrative request is stored. A user is registered with a home subscriber server in response to the received administrative request.

DETAILED DESCRIPTION

The present invention provides methods and apparatuses for allowing one or more subscribers to be administratively registered. A subscriber, e.g., a user, may comprise a mobile device. The embodiments are not limited in this context. In one embodiment, the following can occur:

The HSS is informed, via an administrative interface, that an IMS public user Identities (or set of public user Identities) should be registered.

A serving call session control function (S-CSCF) is selected for that IMS Public User identity (IMPU) (or all the IMS public User Identities that have the same subscription as the IMS Public User Identity against which the provision effort was performed).

That S-CSCF informed that the IMPU is administratively registered. In addition, the S-CSCF is provided with a session initiation protocol (SIP) path that ultimately identifies a SIP user agent (UA) to where the registration should be terminated. This includes going via the proxy call session control function (P-CSCF) functionality if required. In TS 24.229, this is referred to as the "Path header" that the S-CSCF received. The S-CSCF uses this to reach the P-CSCF using the "loose routing functionality".

An alternative approach is that the S-CSCF is not informed upon administrative action, but upon another event—such as a call terminating call. In such a case, the S-CSCF would retrieve the information when it receives a SIP request for the administratively registered IMPU.

FIG. 1 illustrates a system 100 for providing administrative registration according to one embodiment. An administration centre 105 is connected to a home subscriber server (HSS) 110 via an Admin 1 interface. The Admin 1 interface is an interface used for O&M and Service Provisioning. Although there have been initiatives to standardize the Admin 1 interface, this interface is primarily a proprietary interface when implemented in a product. In one embodiment, Administration Centre 105 looks up an HSS for a user and sends an administrative request, e.g., an Administrative Register Request to HSS 110. HSS 110 registers the user with serving call session control function (S-CSCF) 115. In one embodiment, HSS 110 registers the user with S-CSCF 115 over a Cx interface. HSS 110 also provides S-CSCF 115 with information determined from the administrative request. S-CSCF 115 communicates with multimedia resource function controller (MRFC) 125, interrogating call session control function (I-CSCF) 130, proxy call session control function (P-CSCF) 135, and breakout gateway control function (BGCF) 140 via interfaces Mr, Mw, Mw, and Mi respectively. S-CSCF 115 communicates with session initiation protocol application server (SIP-AS) 120 via an IMS service control (ISC) interface. HSS 110 may also communicate with SIP-AS 120 via an Sh interface. SIP-AS 120, MRFC 125, I-CSCF 130, P-CSCF 135, and BGCF 140 are shown in FIG. 1 for completeness, however, it should be apparent to one skilled in the art that S-CSCF 115 is not limited to connections with the aforementioned devices.

Figure 2:
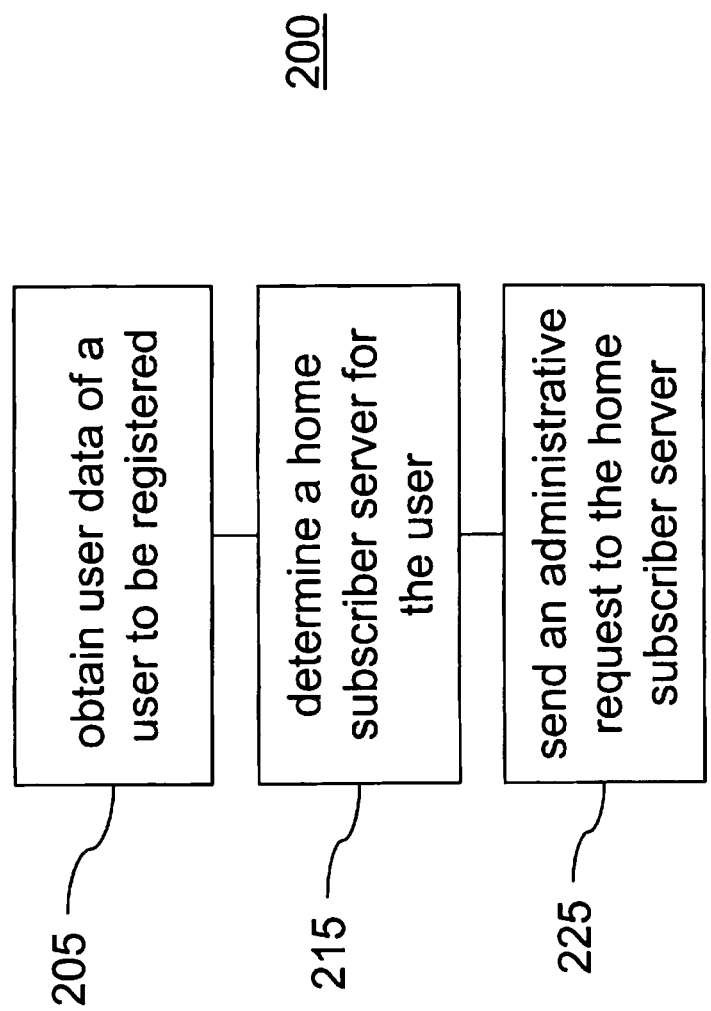
FIG. 2 illustrates a method for providing administrative registration using the administration centre of FIG. 1, according to one embodiment of the present invention.

FIG. 2 illustrates a method 200 for providing administrative registration using administration centre 105, according to one embodiment. In step 205, user data of a user to be registered is obtained. In one embodiment, an operator enters/collects the necessary user data. The operator may comprise a human, machine, computer program, and so forth. In step 215, a home subscriber server, e.g., HSS 110, is determined for the user. In step 225, an administrative request is sent to HSS 110. The administrative request may comprise an S-CSCF name to register the user, the terminating route, and service information.

Figure 3:
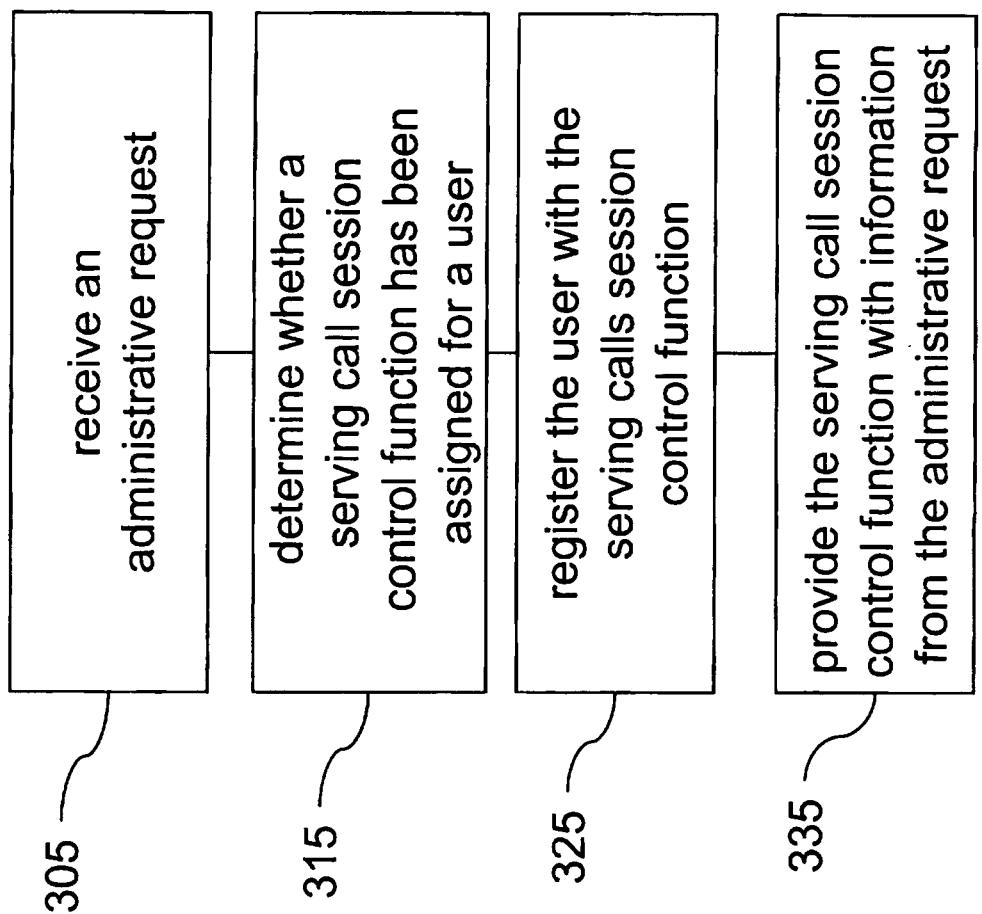
FIG. 3 illustrates a method for providing administrative registration using the home subscriber server of FIG. 1, according to one embodiment of the present invention.

FIG. 3 illustrates a method 300 for providing administrative registration using HSS 110, according to one embodiment. In step 305 an administrative request is received. In step 315 a determination is made as to whether a serving call session control function (S-CSCF) has been assigned for a user. In step 325, the user is registered with an assigned S-CSCF, e.g., S-CSCF 115. In step 335, S-CSCF 115 is provided with information from the administrative request.

Figure 4:
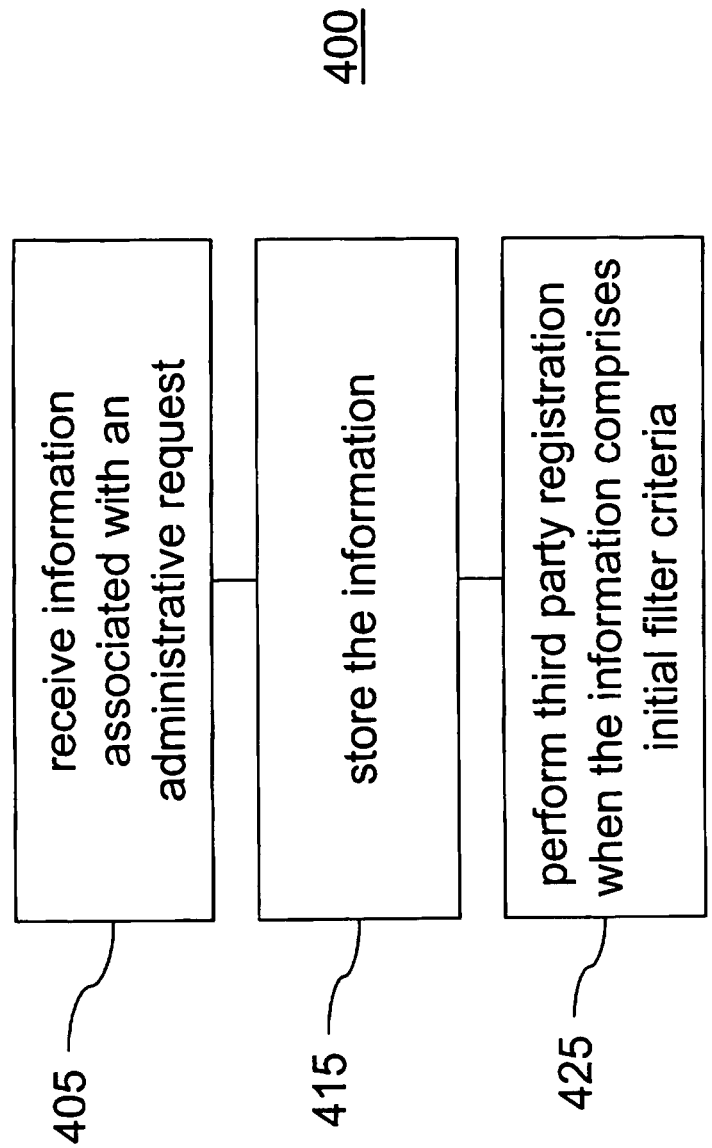
FIG. 4 illustrates a method for providing administrative registration using the serving call session control function of FIG. 1, according to one embodiment of the present invention.

FIG. 4 illustrates a method 400 for providing administrative registration using S-CSCF 115, according to one embodiment. In step 405, information associated with an administrative request is received. In step 415, the information associated with the administrative request is stored. In one embodiment, the information may comprise a terminating route, initial filter criteria, contact information. In step 425, depending on the settings for the subscriber, a third party registration may be performed when the information comprises initial filter criteria. The third party registration is performed if the settings for that subscriber dictate that a third party registration is needed. In one embodiment, the settings for the subscriber are downloaded to the S-CSCF at the registration.

Figure 5:
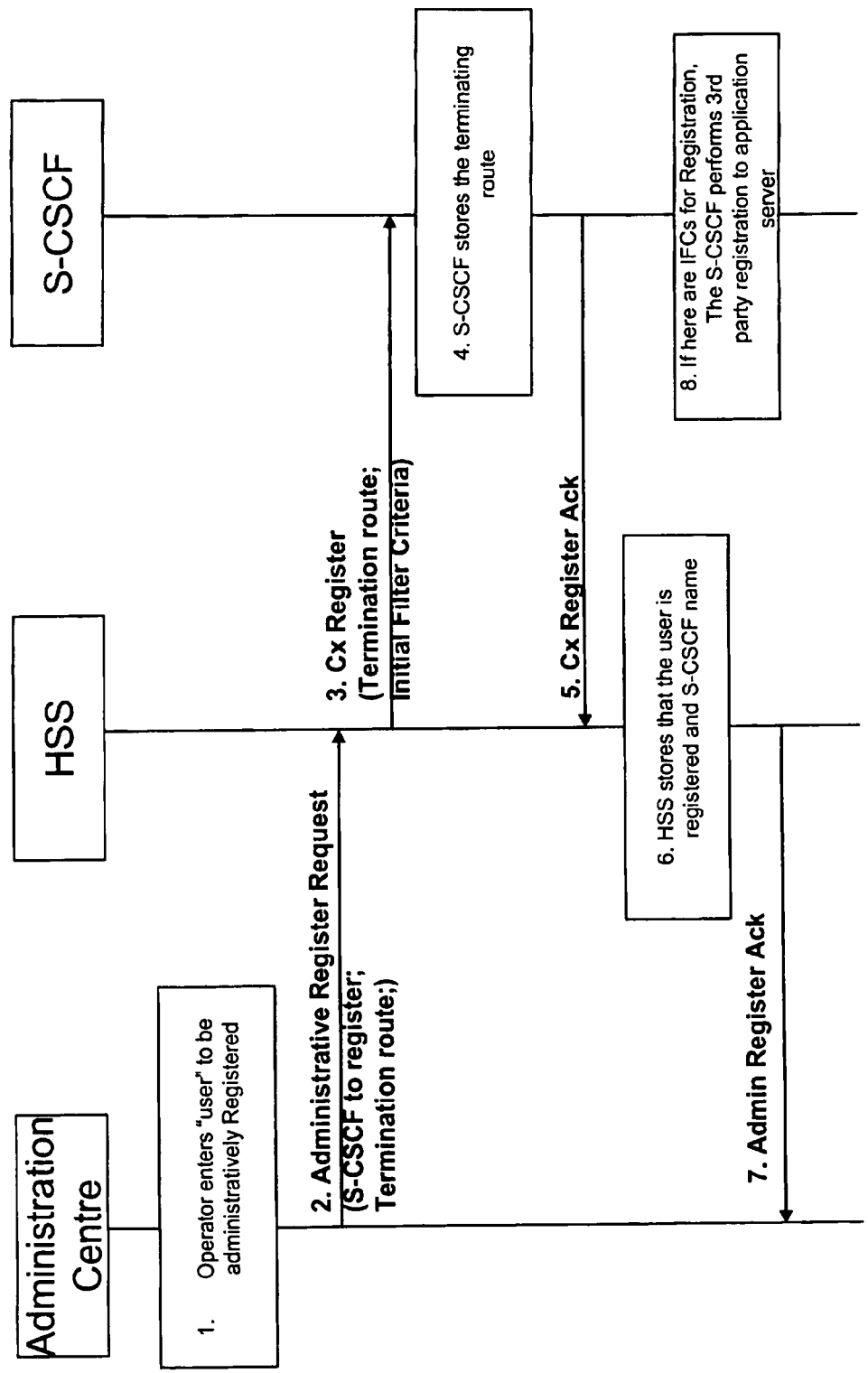
FIG. 5 illustrates a flow diagram of an Administrative Registration procedure for the system of FIG. 1 according to one embodiment of the present invention.

FIG. 5 illustrates a flow diagram of an Administrative Registration procedure according to one embodiment. The steps of FIG. 5 may be implemented in system 100 of FIG. 1. The procedure of this embodiment comprises the following steps:

1. Operator (human/machine/computer program/etc) enters/collects the necessary user data of the user to be registered.

2. The administrative centre 105 looks up an HSS for the user and sends an administrative request to HSS 110. The administrative request may comprise one or more identifiers of the user(s) to be registered. The request may also be applied for a plurality of users already provisioned in HSS 110. The administrative request (2) may comprise the following information:

A) S-CSCF name to register the user;
B) the terminating route (In TS 24.229, this is referred to as the "Path header" that the S-CSCF received. The S-CSCF uses the path header to reach the P-CSCF using the "loose routing functionality"). The terminating route is the route that the S-CSCF will insert when it receives a request for a terminating call. Normally this information is the path towards a P-CSCF, however, for an administratively registered user, the terminating route may be a path towards a MGCF (to get to a mobile switching center (MSC)), private branch exchange (PBX), or any other circuit switched accesses. Any other circuit switched network means that the MGCF may be used to route to a PLMN (the MSC reference), a PSTN/ISDN network, to a PBX, etc. PSTN/ISDN/PLMN are all examples of CS networks;

C) service information (such as "Feature Tags", IMS communication service identifiers, and/or other items to identify the terminal to be registered) are associated with the user, e.g., terminal, and stored in the S-CSCF. ("Feature Tags" fixes the problem of identifying a particular communication service when other data of said service, such as the media being used for it, is not sufficient to do so). Feature Tags express capabilities of registered contacts, i.e., capabilities of a registered terminal. Examples of FTs are audio, video, SIP methods— defined in RFC 2840/3841 and referred to as base feature tags. Other feature tags may be defined to express other capabilities than the ones that exist as base feature tags. Examples are +g.+g.oma.poc.talkburst for Push-to-talk, +g.oma.sip-im, +g.3gpp.app_ref=3gpp-service.ims.icsi.mmtel, etc. These services are implemented on top of IMS. Note that feature Tags are used for service identification in 3GPP, but it is not the complete solution. The complete solution for service identification in 3GPP is based on information in Feature Tags carried in Accept-Contact/Reject-Contact headers, and information carried in a P-Preferred-Service/P-Asserted-Service headers. The information provisioned in the present disclosure shall be used to construct these headers in signalling.

One example of an item to identify a terminal to be registered is a Globally Routable User Agent URI (Uniform Resource Identifier) (GRUU). The IMS architecture supports the possibility for multiple UEs (User Equipment/User Entity) to register with the same Public User Identity. Many IMS based enablers, such as Voice Call Continuity, Presence, Conferencing or Push To Talk, need to be able to identify the origin of SIP signalling and route that SIP signalling to a specific UE instance even when multiple UEs use the same Public User Identity. This issue is fixed by the assignation of GRUU to a specific UE, and its subsequent use for routing messages to a specific UE instance.

If the user already has an S-CSCF assigned due to, e.g., a previous registration or terminating call, the HSS will use the address to the assigned S-CSCF for the signalling in step 3.

If no S-CSCF has previously been assigned or a S-CSCF has been assigned that is not suitable for supporting registered traffic, the HSS will assign an S-CSCF based on the same criteria used for a normal IMS Registration (I-CSCF to HSS signalling where HSS returns "required-CSCF capability" back to the I-CSCF).

Alternatively, the administrative centre may send a SIP message to the S-CSCF (via the I-CSCF) to enable the I-CSCF to perform S-CSCF selection.

3. As a novel procedure between HSS and S-CSCF, the HSS sends a "Cx-Register" to the S-CSCF, for registering a user, providing the S-CSCF with the information received in step 2 above. In addition, the HSS may include "initial Filter Criteria" iFC.

4. S-CSCF 115 stores the terminating route (In TS 24.229, this is referred to as the "Path header" that the S-CSCF received. The S-CSCF uses this to reach P-CSCF 135 using "loose routing functionality".), iFC (such as IMS communication service identifier), contact information, and the like.

5. The Cx-Register request is acknowledged.

6. HSS 110 stores the Registered S-CSCF name, and marks the subscriber as REGISTERED.

7. The administrative command is acknowledged.

8. If there were "initial Filter Criteria" for Registration, then the S-CSCF performs a "third party registration". The "third party registration" procedure before an application server (AS) is detailed, e.g. in 3GPP TS 29.328 V7.4.0 (December 2006), for example in chapter B.1.1.1. According to this embodiment of the invention, the S-CSCF performs this procedure as a part of the novel processing related to the request received on step 3 above.

In one embodiment, a variation of the above flow occurs when the Administrative centre does not include a S-CSCF name. In this embodiment, the "Cx-Register" goes through I-CSCF 130 and I-CSCF 130 performs the S-CSCF selection, e.g., using similar selection criteria as disclosed in 3GPP specifications related to IMS procedures related to S-CSCF selection.

Figure 6:
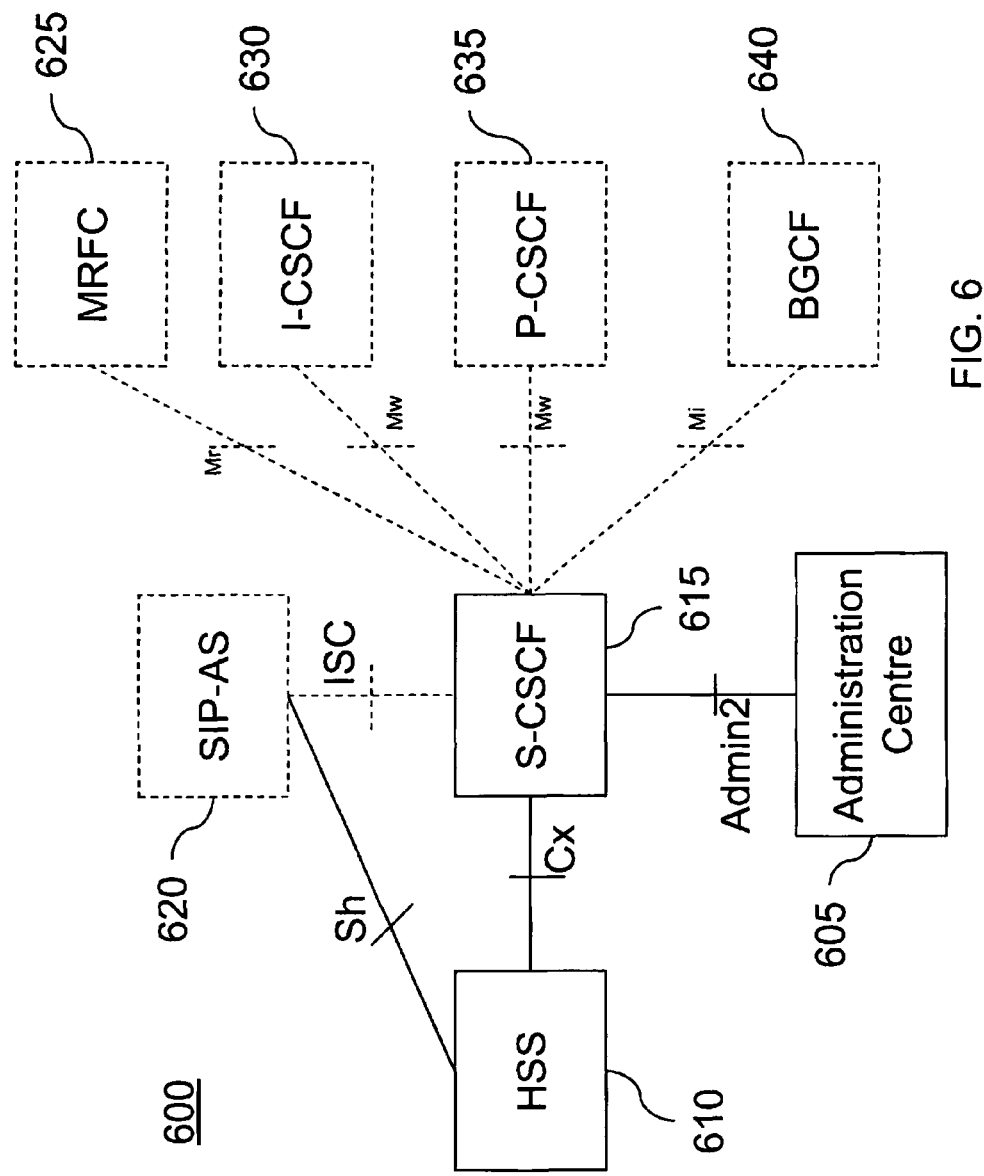
FIG. 6 illustrates a system for providing administrative registration according to one embodiment of the present invention.

FIG. 6 illustrates a system 600 for providing administrative registration according to one embodiment. An administration centre 605 is connected to S-CSCF 615 via an Admin 2 interface. The Admin 2 interface is an interface used for operation and maintenance (O&M) and Service Provisioning. Although there have been initiatives to standardize the Admin 2 interface, this interface is primarily a proprietary interface when implemented in a product. In one embodiment, Administration Centre 605 sends an administrative request, e.g., an Administrative Register Request to S-CSCF 615. S-CSCF 615 registers a user with HSS 610. In one embodiment, S-CSCF 615 registers the user with HSS 610 over a Cx interface. S-CSCF 615 communicates with multimedia resource function controller (MRFC) 625, interrogating call session control function (I-CSCF) 630, proxy call session control function (P-CSCF) 635, and breakout gateway control function (BGCF) 640 via interfaces Mr, Mw, Mw, and Mi respectively. S-CSCF 615 communicates with session initiation protocol application server (SIP-AS) 620 via an IMS service control (ISC) interface. HSS 610 may also communicate with SIP-AS 620 via an Sh interface. SIP-AS 620, MRFC 625, I-CSCF 630, P-CSCF 635, and BGCF 640 are shown in FIG. 6 for completeness, however, it should be apparent to one skilled in the art that S-CSCF 615 is not limited to connections with the aforementioned devices.

Figure 7:
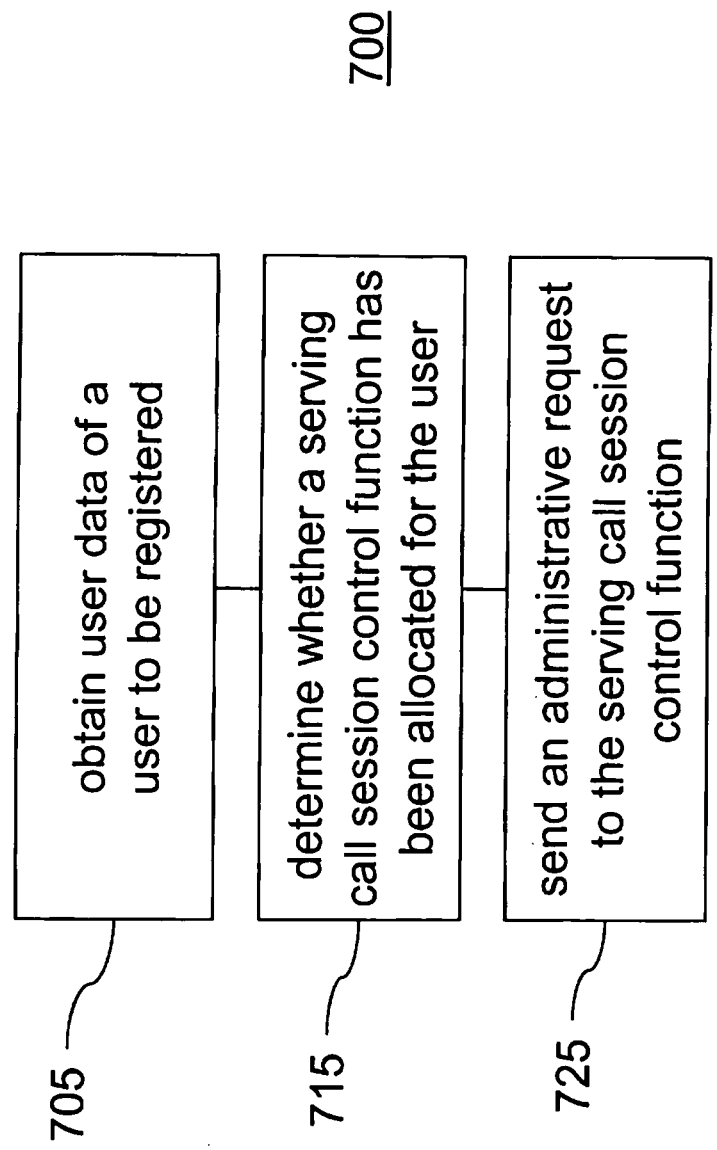
FIG. 7 illustrates a method for providing administrative registration using the administration centre of FIG. 6 according to one embodiment of the present invention.

FIG. 7 illustrates a method for providing administrative registration using administration centre 605 according to one embodiment. In step 705, user data of a user to be registered is obtained. In one embodiment, an operator enters/collects the necessary user data. The operator may comprise a human machine, computer program, and so forth. In step 715, a determination is made as to whether an S-CSCF has been allocated for the user. In step 725 an administrative request is sent to the allocated S-CSCF, e.g., S-CSCF 615.

Figure 8:
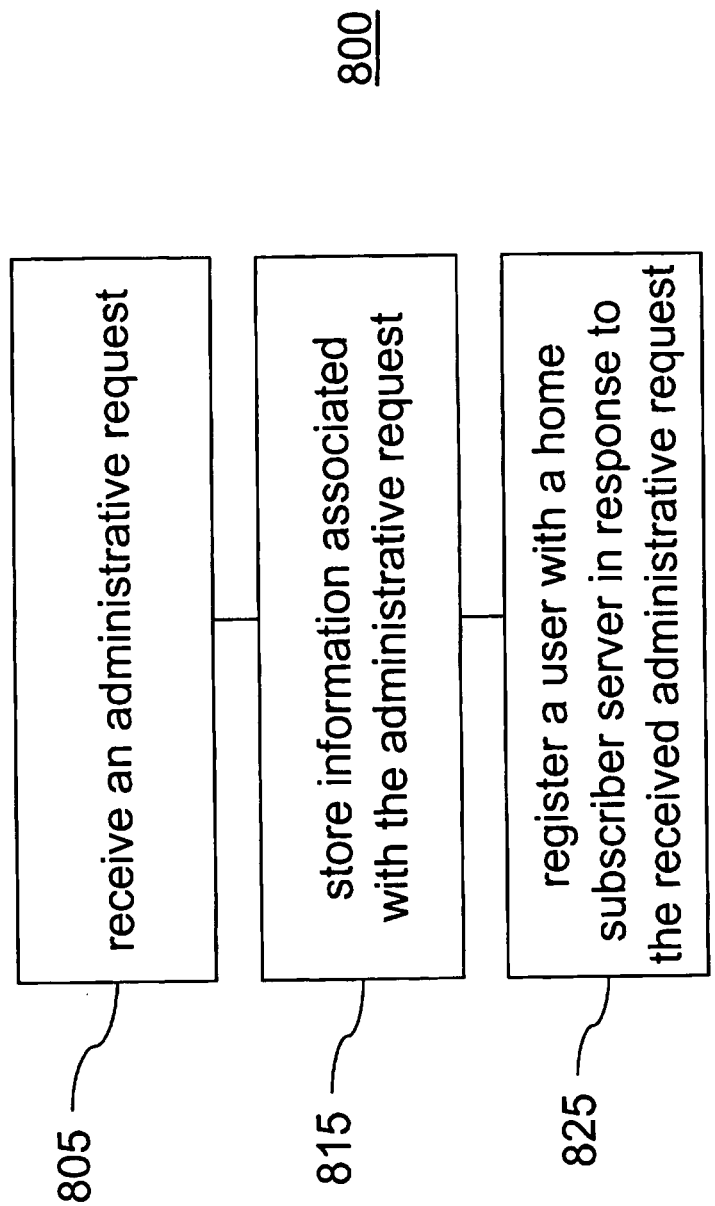
FIG. 8 illustrates a method for providing administrative registration using the serving call session control and home subscriber server of FIG. 6 according to one embodiment of the present invention.

FIG. 8 illustrates a method for providing administrative registration using S-CSCF 615 and HSS 610 according to one embodiment. In step 805, an administrative request is received at S-CSCF 615, e.g. from administration centre 605. In step 815, information associated with the administrative request is stored at S-CSCF 615. In step 825 a user is registered with HSS 610 in response to the received administrative request.

Figure 9:
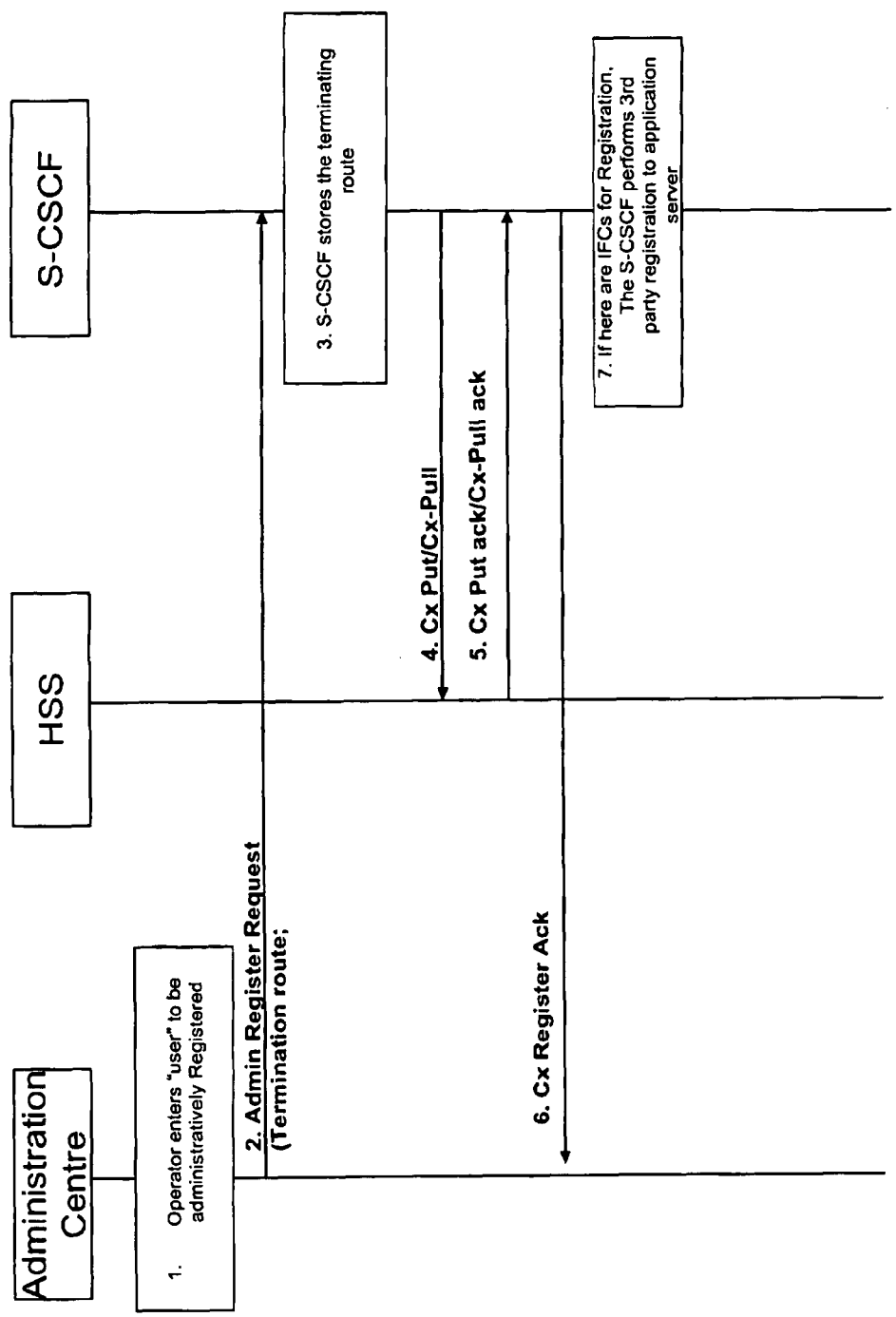
FIG. 9 illustrates a flow diagram of an Administrative Registration procedure for the system of FIG. 6 according to one embodiment of the present invention.

FIG. 9 illustrates a flow diagram of an Administrative Registration procedure according to one embodiment.

1. Operator (human/machine/computer program/etc) enters/collects the necessary user data of the user to be registered.

2. The administrative centre sends an administrative request to the S-CSCF. The administrative request can comprise an identifier of the user(s) to be registered. The request can be also run for a plurality of users already provisioned in the HSS. The administrative request (2) may contain the following information:

A) the terminating route (In TS 24.229, this is referred to as the "Path header" that the S-CSCF received. The S-CSCF uses this to reach the P-CSCF using the "loose routing functionality"). The terminating route is the route that the S-CSCF will insert when it receives a request for a terminating call. Normally this information is the path towards a P-CSCF, however, for an administratively registered user, the terminating route may be a path towards a MGCF (to get to a mobile switching center (MSC)), private branch exchange (PBX), or any other circuit switched accesses. Any other circuit switched network means that the MGCF may be used to route to a PLMN (the MSC reference), a PSTN/ISDN network, to a PBX, etc. PSTN/ISDN/PLMN are all examples of CS networks;

B) service information (such as "Feature Tags", IMS communication service identifiers, and/or other items to identify the terminal to be registered) are associated with the user, e.g., terminal, and stored in the S-CSCF. ("Feature Tags" fixes the problem of identifying a particular communication service when other data of said service, such as the media being used for it, is not sufficient to do so). Feature Tags express capabilities of registered contacts, i.e., capabilities of a registered terminal. Examples of FTs are audio, video, SIP methods—defined in RFC 2840/3841 and referred to as base feature tags. Other feature tags may be defined to express other capabilities than the ones that exist as base feature tags. Examples are +g.+g.oma.poc.talkburst for Push-to-talk, +g.oma.sip-im, +g.3gpp.app_ref=3gpp-service.ims.icsi.mmtel, etc. These services are implemented on top of IMS. Note that feature Tags are used for service identification in 3GPP, but it is not the complete solution. The complete solution for service identification in 3GPP is based on information in Feature Tags carried in Accept-Contact/Reject-Contact headers, and information carried in a P-Preferred-Service/P-Asserted-Service headers. The information provisioned in the present disclosure shall be used to construct these headers in signalling.

One example of an item to identify a terminal to be registered is a Globally Routable User Agent URI (Uniform Resource Identifier) (GRUU). The IMS architecture supports the possibility for multiple UEs (User Equipment/User Entity) to register with the same Public User Identity. Many IMS based enablers, such as Voice Call Continuity, Presence, Conferencing or Push To Talk, need to be able to identify the origin of SIP signalling and route that SIP signalling to a specific UE instance even when multiple UEs use the same Public User Identity. This issue is fixed by the assignment of GRUU to a specific UE, and its subsequent use for routing messages to a specific UE instance.

The Administrative Centre may find an already allocated S-CSCF by using the Sh interface towards HSS. The Administrative Centre uses the Diameter protocol to signal the HSS over the Sh interface.

If a S-CSCF has not been allocated, the administrative centre may select a S-CSCF based on the same criteria that the I-CSCF, e.g., I-CSCF 630, uses.

Alternatively, in one embodiment, administrative centre 605 sends a SIP message to S-CSCF 615 (via I-CSCF 630) to enable the I-CSCF to perform S-CSCF selection.

3. S-CSCF 615 stores the terminating route (In TS 24.229, this is referred to as the "Path header" that the S-CSCF received. The S-CSCF uses the path header to reach the P-CSCF using the "loose routing functionality").

4. S-CSCF 615 performs the registration procedures toward HSS 610 (Cx-Put/Cx-Pull). This registration procedure may be accomplished by using the procedures that exist presently on the Cx interface, which, according to this embodiment of the invention, are triggered by the reception of the request of flow 2.

5. The registration procedure towards HSS 610 is acknowledged.

6. The administrative registration request is acknowledged.

7. If there were "initial Filter Criteria" for Registration, then the S-CSCF performs the required 3rd party registration, as cited earlier with reference to the embodiment of FIG. 1 and FIG. 5.

The above approach requires persistent storage of information in the S-CSCF. This is a new requirement on the S-CSCF.

Terminating calls to the S-CSCF for the administratively registered users work in the same manner as for users "normally" registered from terminals.

Currently, telecommunications nodes, such as: HSSs, CSCFs, or even provisioning apparatuses (e.g. as it could be the illustrated "Administration Centre"), are mostly implemented in computer-based machines. Accordingly, computer programs comprising computer-readable program codes are loaded in computer-based machines of telecommunications systems, causing them to behave according to a predefined manner, as determined by the respective program codes, which are in accordance to the specific functionality specified for the telecommunications nodes these machine implements. Thus, those skilled in creating and/or modifying computer programs, would, without departing of the teachings of the present invention, readily apply them to create and/or modify computer programs suitable to be loaded in a computer-based nodes and apparatuses, so as to make them to behave according to any of the described embodiments.

The invention has been described with respect to some exemplary embodiments in an illustrative and non-restrictive manner. Variations can be readily apparent to those of ordinary skill in the art. While one application of the present disclosure is to target applications accessing over a CS access, it should be noted that the present disclosure is also applicable to IP-PBX, e.g., any enterprise connection, where the enterprise equipment does not perform the registration.

The administrative registrations of users according to the invention, allows a given user to receive services (e.g. make/receive multimedia calls) provided by a first telecommunications network, such as IMS, while connected to a second telecommunications network, such as a PSTN, or other network providing only basic CS services. The operator of a device, e.g. a mobile device, is thus not required to use a specific terminal suited for the first network so as to perform a standard registration in said first network. Further, the solutions of the invention do not require the introduction of any new node in the first telecommunications network.

The invention claimed is:

1. A method implemented by an administration centre for providing administrative registration in an internet protocol multimedia subsystem, IMS, comprising:

obtaining, by a computer of the administration centre, user data of a user to be registered;

determining, by the computer, a home subscriber server for the user; and sending, by the computer, an administrative request to the home subscriber server, where the administrative request includes an identifier of the user, where the administrative registration of the user allows the user to use a terminal to receive services from the IMS while the terminal is connected to a network, where the network provides only circuit switched, CS, services, where the terminal is not suited to perform a registration with the IMS, where an operator enters the user data associated with the administrative request, where the registration of the user is provided without the terminal exchanging registration signaling with the IMS, and where the administrative request comprises Feature Tags identifying communication capabilities of the terminal to be registered for the user by the administrative registration.

2. The method of claim 1 wherein the administrative request comprises a serving call session control function name to register the user.

3. The method of claim 1 wherein the administrative request comprises a terminating route.

4. The method of claim 1, wherein the terminal is not suited to ever be registerable with the IMS.

5. A method implemented by a home subscriber server, HSS, for providing administrative registration in an internet protocol multimedia subsystem, IMS, comprising:
   receiving, by a computer of the home subscriber server, an administrative request from an administrative center, wherein the administrative request includes an identifier of a user to be registered;
   determining, by the computer, whether a serving call session control function has been assigned for the user;
   registering, by the computer, the user with the serving call session control function; and
   providing, by the computer, the serving call session control function with information from the administrative request, where the administrative registration of the user allows the user to use a terminal to receive services from the IMS while the terminal is connected to a network, where the network provides only circuit switched, CS, services, where the terminal is not suited to perform a registration with the IMS, where an operator enters user data associated with the administrative request, where the registration of the user is provided without the terminal exchanging registration signaling with the IMS, and where the administrative request comprises Feature Tags identifying communication capabilities of the terminal to be registered for the user by the administrative registration.

6. The method of claim 5, further comprising signaling using an address of the serving call session control function when the serving call session control function has already been assigned.

7. The method of claim 5, further comprising, when there is no previously assigned serving call session control function, assigning the serving call session control function based on internet protocol multimedia subsystem criteria.

8. The method of claim 5, further comprising, when there is no previously assigned serving call session control function, sending a session initiation protocol message to the serving call session control function via an interrogating call session control function to enable the interrogating call session control function to perform serving call session control function selection.

9. The method of claim 5, further comprising:
   storing a registration status of the user; and
   storing a name of the serving call session control function.

10. The method of claim 5, wherein the information comprises initial filter criteria.

11. A method implemented by a serving call session control function, S-CSCF, for providing administrative registration in an internet protocol multimedia subsystem, IMS, comprising:
   receiving, by a computer of the S-CSCF, information associated with an administrative request, wherein the administrative request includes an identifier of a user to be registered, and wherein the administrative request was initiated by an administrative centre;
   storing, by the computer, the information;
   performing, by the computer, a third party registration when the information comprises initial filter criteria, where the administrative registration of the user allows the user to use a terminal to receive services from the IMS while the terminal is connected to a network, where the network provides only circuit switched, CS, services, where the terminal is not suited to perform a registration with the IMS, where an operator enters user data associated with the administrative request, where the registration of the user is provided without the terminal exchanging registration signaling with the IMS, and where the administrative request comprises Feature Tags identifying communication capabilities of the terminal to be registered for the user by the administrative registration.

12. An administration centre for providing administrative registration in an internet protocol multimedia subsystem, IMS, comprising:
   means for obtaining user data of a user to be registered;
   means for determining a home subscriber server for the user; and
   means for sending an administrative request to the home subscriber server, wherein the administrative request includes an identifier of the user, where the administrative registration of the user allows the user to use a terminal to receive services from the IMS while the terminal is connected to a network, where the network provides only circuit switched, CS, services, where the terminal is not suited to perform a registration with the IMS, where an operator enters the user data associated with the administrative request, where the registration of the user is provided without the terminal exchanging registration signaling with the IMS, and where the administrative request comprises Feature Tags identifying communication capabilities of the terminal to be registered for the user by the administrative registration.

13. A home subscriber server, HSS, for providing administrative registration in an internet protocol multimedia subsystem, IMS, comprising:
   means for receiving an administrative request from an administrative center, wherein the administrative request includes an identifier of a user to be registered;
   means for determining whether a serving call session control function has been assigned for a user;
   means for registering the user with the serving call session control function; and
   means for providing the serving call session function with information from the administrative request, where the administrative registration of the user allows the user to use a terminal to receive services the IMS while the terminal is connected to a network, where the network provides only circuit switched, CS, services, where the terminal is not suited to perform a registration with the IMS, where an operator enters user data associated with the administrative request, where the registration of the user is provided without the terminal exchanging registration signaling with the IMS, and where the administrative request comprises Feature Tags identifying communication capabilities of the terminal to be registered for the user by the administrative registration.

14. A serving call session control function, S-CSCF, for providing administrative registration in an internet protocol multimedia subsystem, IMS, comprising:
- means for receiving information associated with an administrative request, wherein the administrative request includes an identifier of a user to be registered, and wherein the administrative request was initiated by an administrative centre;
- means for storing the information;
- means for performing a third party registration when the information comprises initial filter criteria, where the administrative registration of the user allows the user to use a terminal to receive services from the IMS while the terminal is connected to a network, where the network provides only circuit switched, CS, services, where the terminal is not suited to perform a registration with the IMS, where an operator enters user data associated with the administrative request, where the registration of the user is provided without the terminal exchanging registration signaling with the IMS, and where the administrative request comprises Feature Tags identifying communication capabilities of the terminal to be registered for the user by the administrative registration.

15. A method implemented by an administration centre for providing administrative registration in an internet protocol multimedia subsystem, IMS, comprising:
- obtaining, by a computer of the administration centre, user data of a user to be registered;
- determining, by the computer, whether a serving call session control function has been allocated for the user; and
- sending, by the computer, an administrative request to the serving call session control function, where the administrative request includes an identifier of the user, where the administrative registration of the user allows the user to use a terminal to receive services from the IMS while the terminal is connected to a network, where the network provides only circuit switched, CS, services, where the terminal is not suited to perform a registration with the IMS, where an operator enters the user data associated with the administrative request, where the registration of the user is provided without the terminal exchanging registration signaling with the IMS, and where the administrative request comprises Feature Tags identifying communication capabilities of the terminal to be registered for the user by the administrative registration.

16. The method of claim 15, wherein determining whether the serving call session control function has been allocated further comprises using an Sh interface towards a home subscriber server to find a previously allocated serving call session control function.

17. The method of claim 15, further comprising, when there is no previously allocated serving call session control function, selecting the serving call session control function based on interrogating call session control function criteria.

18. The method of claim 15, further comprising, when there is no previously allocated serving call session control function, sending a session initiation protocol message to the serving call session control function via an interrogating call session control function to enable the interrogating call session control function to perform serving call session control function selection.

19. The method of claim 15 wherein the administrative request comprises a terminating route.

20. A method implemented by a serving call session control function, S-CSCF, for providing administrative registration in an internet protocol multimedia subsystem, IMS, comprising:
- receiving, by a computer of the S-CSCF, an administrative request, where the administrative request includes an identifier of a user to be registered, and where the administrative request was initiated by an administrative centre;
- storing, by the computer, information associated with the administrative request; and
- registering, by the computer, a user with a home subscriber server in response to the received administrative request, where the administrative registration of the user allows the user to use a terminal to receive services from the IMS while the terminal is connected to a network, where the network provides only circuit switched, CS, services, where the terminal is not suited to perform a registration with the IMS, where an operator enters user data associated with the administrative request, where the registration of the user is provided without the terminal exchanging registration signaling with the IMS, and where the administrative request comprises Feature Tags identifying communication capabilities of the terminal to be registered for the user by the administrative registration.

21. The method of claim 20, further comprising performing a third party registration when the information comprises initial filter criteria.

22. The method of claim 20, wherein said registering comprises using a put/pull procedure over a Cx interface.

23. An administration centre for providing administrative registration in an internet protocol multimedia subsystem, IMS, comprising:
- means for obtaining user data of a user to be registered, where the administrative request includes an identifier of a user to be registered;
- means for determining whether a serving call session control function has been allocated for the user; and
- means for sending an administrative request to the serving call session control function, where the administrative request includes an identifier of the user, where the administrative registration of the user allows the user to use a terminal to receive services from the IMS while the terminal is connected to a network, where the network provides only circuit switched, CS, services, where the terminal is not suited to perform a registration with the IMS, where an operator enters the user data associated with the administrative request, where the registration of the user is provided without the terminal exchanging registration signaling with the IMS, and where the administrative request comprises Feature Tags identifying communication capabilities of the terminal to be registered for the user by the administrative registration.

24. A serving call session control function, S-CSCF, for providing administrative registration in an internet protocol multimedia subsystem, IMS, comprising:
- means for receiving an administrative request, where the administrative request includes an identifier of a user to be registered, and where the administrative request was initiated by an administrative centre;
- means for storing information associated with the administrative request; and
- means for registering a user with a home subscriber server in response to the received administrative request, where the administrative registration of the user allows the user to use a terminal to receive services from the IMS while the terminal is connected to a network, where the network provides only circuit switched, CS, services, where the terminal is not suited to perform a registration with the IMS, where an operator enters user data associated with the administrative request, where the registration of the user is provided without the terminal exchanging registration signaling with the IMS, and where the administrative request comprises Feature Tags identifying communication capabilities of the terminal to be registered for the user by the administrative registration.

25. A method for providing administrative registration in an internet protocol multimedia subsystem, IMS, which includes at least an administration centre, home subscriber server, and a serving call session control function, the method comprising steps of:

the administration centre comprising a computer configured for performing the following steps:
obtaining user data of a user to be registered;
determining the home subscriber server for the user; and
sending an administrative request to the home subscriber server, where the administrative request includes an identifier of the user;
the home subscriber server comprising a computer configured for performing the following steps:
receiving the administrative request;
determining whether a serving call session control function has been assigned for a user;
registering the user with the serving call session control function; and
providing the serving call session control function with information from the administrative request;
the serving call session control function comprising a computer configured for performing the following steps:
receiving information associated with the administrative request;
storing the information;
performing a third party registration when the information comprises initial filter criteria, where the administrative request includes an identifier of the user, wherein the administrative registration of the user allows the user to use a terminal to receive services from the IMS while the terminal is connected to a network, where the network provides only circuit switched, CS, services, where the terminal is not suited to perform a registration with the IMS, where an operator enters the user data associated with the administrative request, where the registration of the user is provided without the terminal exchanging registration signaling with the IMS, and where the administrative request comprises Feature Tags identifying communication capabilities of the terminal to be registered for the user by the administrative registration.

26. An internet protocol multimedia subsystem, IMS, which includes at least an administration centre, home subscriber server, and a serving call session control function for providing administrative registration, the IMS comprising:

the administration centre including:
means for obtaining user data of a user to be registered;
means for determining the home subscriber server for the user; and
means for sending an administrative request to the home subscriber server, wherein the administrative request includes an identifier of the user;
the home subscriber server including:
means for receiving the administrative request;
means for determining whether a serving call session control function has been assigned for a user;
means for registering the user with the serving call session control function; and
means for providing the serving call session function with information from the administrative request;
the serving call session control function including:
means for receiving information associated with the administrative request;
means for storing the information;
means for performing a third party registration when the information comprises initial filter criteria, where the administrative request includes an identifier of the user, where the administrative registration of the user allows the user to use a terminal to receive services from the IMS while the terminal is connected to a network, where the network provides only circuit switched, CS, services, where the terminal is not suited to perform a registration with the IMS, where an operator enters the user data associated with the administrative request, where the registration of the user is provided without the terminal exchanging registration signaling with the IMS, and where the administrative request comprises Feature Tags identifying communication capabilities of the terminal to be registered for the user by the administrative registration.

27. A method for providing administrative registration in an internet protocol multimedia subsystem, IMS, which includes at least an administration centre, home subscriber server, and a serving call session control function, the method comprising steps of:

the administration centre comprising a computer configured for performing the following steps:
obtaining user data of a user to be registered;
determining whether a serving call session control function has been allocated for the user; and
sending an administrative request to the serving call session control function, wherein the administrative request includes an identifier of the user;
the serving call session control function comprising a computer configured for performing the following steps:
receiving an administrative request;
storing information associated with the administrative request; and
registering the user with the home subscriber server in response to the received administrative request, where the administrative request includes an identifier of the user, where the administrative registration of the user allows the user to use a terminal to receive services from the IMS while the terminal is connected to a network, where the network provides only circuit switched, CS, services, where the terminal is not suited to perform a registration with the IMS, where an operator enters the user data associated with the administrative request, where the registration of the user is provided without the terminal exchanging registration signaling with the IMS, and where the administrative request comprises Feature Tags identifying communication capabilities of the terminal to be registered for the user by the administrative registration.

28. An internet protocol multimedia subsystem, IMS, which includes at least an administration centre, home subscriber server, and a serving call session control function for providing administrative registration, the IMS comprising:

the administration centre comprising a computer configured for performing the following steps:
  obtaining user data of a user to be registered;
  determining whether a serving call session control function has been allocated for the user; and
  sending an administrative request to the serving call session control function, wherein the administrative request includes an identifier of the user;
the serving call session control function comprising a computer configured for performing the following steps:
  receiving the administrative request;
  storing information associated with the administrative request; and
  registering the user with the home subscriber server in response to the received administrative request, where the administrative request includes an identifier of the user, and where the administrative registration of the user allows the user to use a terminal to receive services from the IMS while the terminal is connected to a network, where the network provides only circuit switched, CS, services, where the terminal is not suited to perform a registration with the IMS, where an operator enters the user data associated with the administrative request, where the registration of the user is provided without the terminal exchanging registration signaling with the IMS, and where the administrative request comprises Feature Tags identifying communication capabilities of the terminal to be registered for the user by the administrative registration.

* * * * *

UNITED STATES PATENT AND TRADEMARK OFFICE
CERTIFICATE OF CORRECTION

PATENT NO.        : 8,489,743 B2
APPLICATION NO.   : 12/027006
DATED             : July 16, 2013
INVENTOR(S)       : Aström et al.

It is certified that error appears in the above-identified patent and that said Letters Patent is hereby corrected as shown below:

On the Title Page, in the Figure, in Box "8", Line 1, delete "If here" and insert -- If there --, therefor.

On the Title Page, in the Figure, in Box "8", Line 2, delete "The" and insert -- the --, therefor.

On Title Page 2, in Item [56], under "OTHER PUBLICATIONS", in Column 2, Line 1, delete "et al." and insert -- et al., --, therefor.

On Title Page 2, in Item [56], under "OTHER PUBLICATIONS", in Column 2, Line 2, delete "et al." and insert -- et al., --, therefor.

In the Drawings

Fig. 5, Drawing Sheet 5 of 9, in Box "8", Line 1, delete "If here" and insert -- If there --, therefor.

Fig. 5, Drawing Sheet 5 of 9, in Box "8", Line 2, delete "The" and insert -- the --, therefor.

Fig. 9, Drawing Sheet 9 of 9, delete "(Termination route;" and insert -- (Termination route;) --, therefor.

Fig. 9, Drawing Sheet 9 of 9, in Box "7", Line 1, delete "If here" and insert -- If there --, therefor.

Fig. 9, Drawing Sheet 9 of 9, in Box "7", Line 2, delete "The" and insert -- the --, therefor.

In the Specification

In Column 6, Line 48, delete "human" and insert -- human, --, therefor.

In Column 8, Line 21, delete "Centre")," and insert -- Centre"); --, therefor.

Signed and Sealed this
Eighteenth Day of February, 2014

Michelle K. Lee
*Deputy Director of the United States Patent and Trademark Office*